(No Model.) 2 Sheets—Sheet 1.

C. W. COTTON, W. C. MARGEDANT, J. T. GARDNER & A. W. G. MARGEDANT.
MACHINE FOR PREPARING SPOKES.

No. 439,386. Patented Oct. 28, 1890.

Witnesses:
A. C. Rogers.
C. Crawford

Charles W. Cotton
William C. Margedant
John T. Gardner
A. G. W. Margedant
Inventors by James W. See
Attorney (No Model.) 2 Sheets—Sheet 2.

C. W. COTTON, W. C. MARGEDANT, J. T. GARDNER & A. W. G. MARGEDANT.
MACHINE FOR PREPARING SPOKES.

No. 439,386. Patented Oct. 28, 1890.

UNITED STATES PATENT OFFICE.

CHARLES W. COTTON, OF INDIANAPOLIS, INDIANA, AND WILLIAM C. MARGEDANT, JOHN T. GARDNER, AND AUGUST W. G. MARGEDANT, OF HAMILTON, OHIO, ASSIGNORS TO THE AMERICAN WHEEL COMPANY, OF CHICAGO, ILLINOIS.

MACHINE FOR PREPARING SPOKES.

SPECIFICATION forming part of Letters Patent No. 439,386, dated October 28, 1890.

Application filed May 10, 1890. Serial No. 351,213. (No model.)

*To all whom it may concern:*

Be it known that we, CHARLES WARD COTTON, of Indianapolis, Marion county, Indiana, and WILLIAM C. MARGEDANT, JOHN T. GARDNER and AUGUST W. G. MARGEDANT, of Hamilton, Butler county, Ohio, have invented certain new and useful Improvements in Machines for Preparing Spokes, of which the following is a specification.

The usual course of procedure in spokemaking is to take the rough billet, center it in the Blanchard lathe, there do the turning, and later chuck it by the turned work in sundry appropriate machines, and there perform the operations of tenoning, mitering, (if miterd,) throating, and facing; but our Mr. Cotton has invented a new method of preparing spokes, for which he filed application for United States Patent April 24, 1890. In the execution of his method the rough billet is grasped at two points, and while thus grasped there is produced upon its head a shank or side facing having a length equal to the intended tenon plus the length of the intended miter plus a portion of the length of the intended throat, and the end of this shank is square with its side faces. The billet is subsequently held in the Blanchard lathe by a carrier which engages the end corners of the shank. The result of this method is a superior economy in work and lumber, and a spoke which, when finished, will have its head-work true with its turned work. Our present invention relates to a machine for carrying out Mr. Cotton's method of preparing the spokes. In our machine, which has many of the characteristics of a tenoning-machine, the spoke-billets are carried in series transversely between cutter-heads, which produce the shank-faces, and at the same time between equalizing-saws, which operate on the ends of the billets.

Our invention will be readily understood from the following description, taken in connection with the accompanying drawings, in which—

Figure 3:
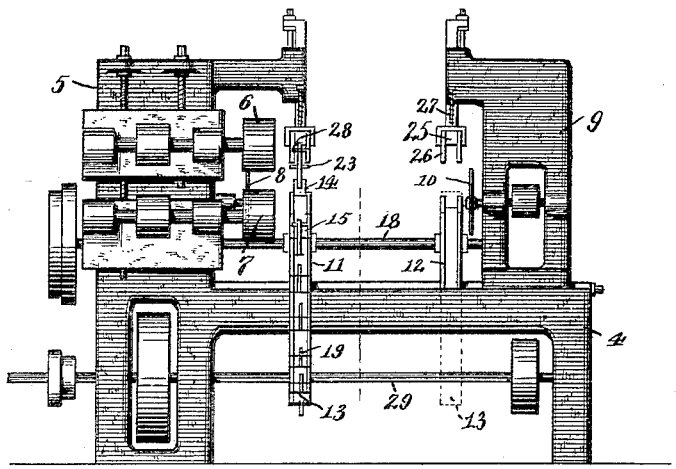
Figure 4:
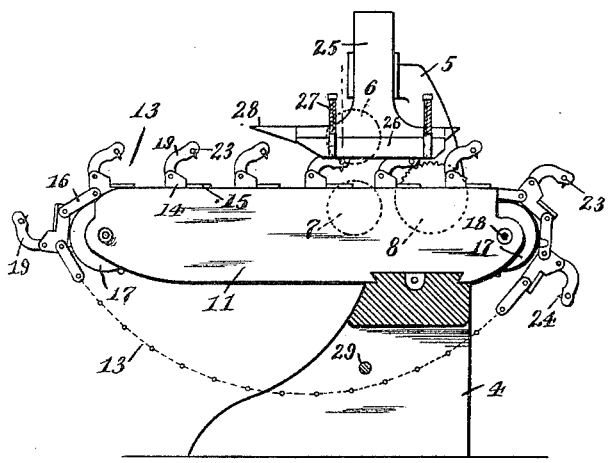
Figure 1:
Figure 2:
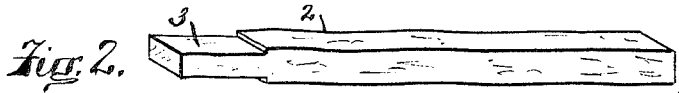
Figure 5:
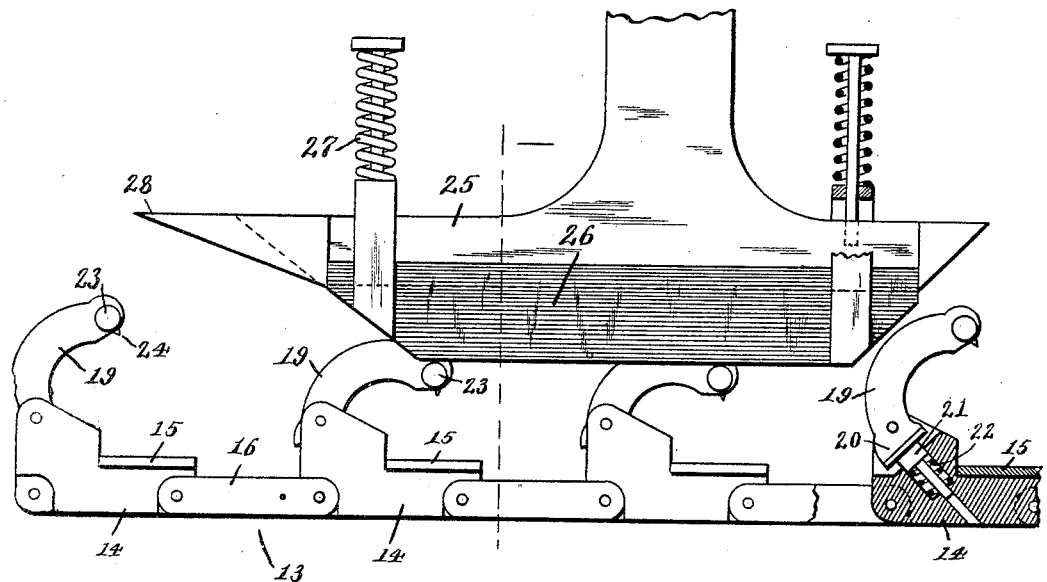
Figure 6:
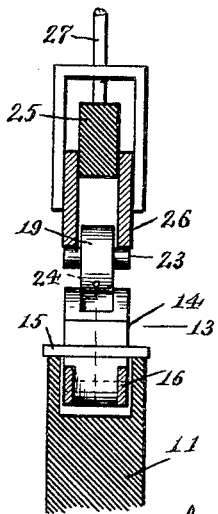

Figure 1 is a perspective view of a rough spoke-billet; Fig. 2, a perspective view of the same billet after being subjected to the operation of our machine; Fig. 3, a front view of a machine exemplifying our present invention, the right-hand carrying-chain being omitted; Fig. 4, a vertical transverse section of the machine, the lower portion of the exposed carrying-chain being exhibited by course-line only; Fig. 5, a side elevation of one of the carrying-chains in conjunction with its pressure-bar, one of the chuck-links of the chain appearing in vertical longitudinal section; and Fig. 6, a vertical transverse section of the matter of Fig. 5 shown in conjunction with a portion of its chain-bearer. Figs. 5 and 6 are upon a much enlarged scale with reference to Figs. 3 and 4. Figs. 1 and 2 are to no particular scale.

In the drawings, 1 indicates the rough billet which is to form a spoke; 2, the same billet after being subjected to the operation of our machine; 3, the shank produced on the billet by the operation of our machine, this shank having a thickness equal to at least the greatest thickness desired at the head of the spoke, and having a length equal to the length of the intended tenon plus the length of the intended miter, if there is to be a miter, plus a portion of the length of the intended throat; 4, the general frame of the machine, which frame may be described in a general way as a horizontal bed; 5, an upright portion at one end of the frame to carry the adjustable cutter-housings, as is usual in tenoning-machines; 6, the upper cutter-head, disposed with its axis horizontal and carried by a vertically-adjustable housing, as in tenoning-machines; 7, the lower cutter-head, similarly mounted, the cutter-heads being illustrated as mere disks of revolution; 8, a circular saw mounted upon the upright 5 and to the rear of the cutter-heads, the axis of the saw being parallel with the axis of the cutter-heads, the plane of the operations of the saw being such that it will cut off more or less of the end portion of the billet which has been shank-faced by the cutter-heads; 9, a tail-block or upright mounted upon the end of the frame opposite the cutter-heads and arranged for adjustment along the frame to and from the cutter-heads; 10, a second saw mounted in the tail-block, with its axis substantially coincident with the axis of the first-mentioned saw; 11, a chain-bearer, consisting of a bar longitudinally grooved at its upper edge and secured to the frame at right angles to the axis of the cutter-heads, the upper grooved edge of this chain-bearer lying horizontally, this chain-bearer being disposed pretty near the cutter-heads; 12, a similar chain-bearer mounted on the frame some distance from the cutter-heads and arranged for adjustment along the frame to and from the first-mentioned chain-bearer; 13, carrier-chains supported by the chain-bearers, the upper portions of these chains lying in the top grooves of the chain-bearers, each chain being endless and carrying billet-grasping devices, as will be explained; 14, chuck-blocks carried by the chains and forming the alternate links of the chains, these blocks projecting upwardly beyond the upper edges of the chain-bearers; 15, a chuck-plate carried by each chuck-block, the plate being formed upon or secured to the chuck-blocks, these plates projecting sidewise from the chuck-blocks, so as to take a bearing on the upper edges of the chain-bearers as each chuck-block in succession passes along the top of the chain-bearer; 16, the intermediate links of the chains, the same consisting of pairs of flat links pivoted to the contiguous chuck-blocks; 17, sprocket-wheels carried at the ends of the chain-bearers and serving to support the chains at the ends of the chain-bearers; 18, a feed-shaft arranged to be driven by power and extending along the machine and engaging a sprocket-wheel at one end of each chain-bearer; 19, a jaw, one pivoted to each chuck-block by a pivot whose axis is horizontal and at right angles to the plane of movement of the chains, these jaws being adapted to move their free ends to and from the chuck-plates 15 so as to grasp spoke-billets laid upon the chuck-plates; 20, a facet formed at the heel of each chuck-jaw parallel with the jaw-pivot; 21, a plunger mounted in each chuck-jaw and having an end face adapted to take a fair bearing against the facet of the jaw when the jaw is in its open position; 22, a spring at each of these plungers, arranged to cause the plunger to make forcible but yielding engagement with its jaw-facet, the tendency of the spring and plunger being, therefore, to hold the jaw forcibly but yieldingly in open position; 23, lugs projecting sidewise from each side of each chuck-jaw at the free end of the jaw; 24, a spur projecting from the free end of each chuck-jaw toward its chuck-plate, these spurs serving to increase the grasping power of the chucks, the spurs being, however, not at all essential; 25, a horizontal bar supported by the frame, one over and parallel with each of the chain-bearers, these bars being arranged for vertical adjustment; 26, a pair of pressure-bars supported by the bars just mentioned, a pressure-bar at each side of each supporting-bar, the two pressure-bars of a pair forming, however, a single structure, the lower edges of the pressure-bars projecting below their supporting-bars; 27, spring-studs engaging the pressure-bars, and their supporting-bars and serving to permit the pressure-bars to rise and fall against spring resistance, there being a spring-stud at each end of each pair of pressure-bars, so that the ends may rise and fall independently; 28, inclines at the under forward ends of the pressure-bars and their supporting-bars, serving to permit the ready entrance of the elevated free ends of the chuck-jaws as they reach the pressure-bars; and 29, a counter-shaft, which, if provided, may be utilized in giving motion to the various parts of a machine, which, however, may be driven by any other ordinary or appropriate means.

That portion seen at the left of Fig. 4 is the front of the machine, and it is there that the billets are placed in the chucks. It will be noticed that the chains present several open chucks before the pressure-bars are reached in the course of the travel of the chucks, the chucks moving from the left toward the pressure-bars. As each chuck-plate moves upward and reaches the top of its chain-bearer, it takes a fair sliding bearing on the top of the chain-bearer, and in this condition slides along the top of the chain-bearer. The operator places a billet in each pair of chucks as they reach the top of the chain-bearers in turn, the rough billet being placed on the two chains and resting on the appropriate two chuck-plates. In this condition the billets are carried along, and as the chucks reach the pressure-bars the free ends of the jaws pass under the pressure-bars, the lugs 23 impinging under the pressure-bars. These lugs ride down under the pressure-bars, and consequently the jaws are forced downwardly onto the billets, firmly clamping the billets between the jaws and plates. While thus clamped the billets will be carried forward, and the two cutter-heads will produce the shank-faces and the two saws will appropriately square the ends of the billets. As the chucks pass from under the pressure-bars, the free ends of their jaws are at liberty to rise and the plunger-springs effect the rising motion, thus opening the chucks and permitting the prepared billets to drop from the chucks as the chucks start downwardly on their return course. The rough billets are irregular and not uniform in cross dimension; but the mounting of the pressure-bars with springs at each end of them causes the pressure-bars to exert a yielding clamping-pressure on each chuck independently. The pressure-bars are of such length as to engage two and not more than two chucks of a chain at once. The bars may, if desired, be arranged to engage but one chuck of a chain at a time; but it will hardly be found practicable to lengthen them so as to engage three chucks of a chain at a time, as this would interfere with the independence of clamping action on the separate billets.

The tail-block 9 and chain-bearer 12 are made adjustable along the frame so as to suit different lengths of spokes, and the supporting-bars 25 are made adjustable vertically so as to suit various thicknesses of billets, and this latter adjustment may, if desired, be also employed in determining the pressure with which the pressure-bars shall act on the chuck-jaws. The cutter-heads are made adjustable to suit various thicknesses of shanking.

Of course if the machine is designed for working upon one size and character of spokes some or all of these adjustments may be dispensed with.

The shaft 18 drives the two chains continuously, and it will, of course, be understood that the two chains are so arranged with reference to each other that their chucks will be in line with each other so as to carry the billets parallel with the axis of the cutter-heads. The traveling speed of the chain is governed entirely by the capacity of the attendant to supply the chucks with billets.

We have shown the chains as being provided with chucks at their alternate links, but the number may be lessened or increased, if desired.

We claim as our invention—

1. The combination, substantially as set forth, of a frame having an upright, a tail-block arranged to slide on the frame, a pair of cutter-heads mounted on said frame-upright and projecting inwardly toward the tail-block, a cut-off saw near the cutter-heads and disposed inwardly from said frame-upright, a cut-off saw mounted on the tail-block and disposed inward therefrom, and a billet-carrier upon the frame in the open space between said upright and tail-block arranged to carry billets in procession through space and past said cutter-heads and saws.

2. The combination, substantially as set forth, of a pair of parallel chain-bearers, endless chains mounted thereon and arranged for coincident travel, chuck-plates carried by said chains and arranged to bear on the tops of the chain-bearers, a pivoted chuck-jaw at each chuck-plate arranged to move to and from its chuck-plate, a spring at each chuck-jaw holding the jaw normally open, a pressure-bar mounted over each chain-bearer and arranged to engage the chuck-jaws and force them toward their chuck-plates, and cutting-tools in the path of the piece carried by the chucks.

3. The combination, substantially as set forth, with the chain-bearers, chains, chucks carried by the chains and having chuck-plates and chuck-jaws, and cutting-tools to operate on the work carried by the chucks, of pressure-bars over each chain-bearer and arranged to engage the two chuck-jaws of a chain at once, and a spring at each end of said pressure-bars arranged to permit the ends of the pressure-bars to act on the two chuck-jaws independently.

C. W. COTTON.
WM. C. MARGEDANT.
JOHN T. GARDNER.
AUGUST W. G. MARGEDANT.

Witnesses:
J. W. SEE,
A. C. ROGERS.